(12) United States Patent
Watanabe

(10) Patent No.: US 7,535,158 B2
(45) Date of Patent: May 19, 2009

(54) STRESS SENSITIVE ELEMENT

(75) Inventor: Jun Watanabe, Chigasaki (JP)

(73) Assignee: Epson Toyocom Corporation, Tokyo (JP)

( * ) Notice: Subject to any disclaimer, the term of this patent is extended or adjusted under 35 U.S.C. 154(b) by 0 days.

(21) Appl. No.: 12/000,637

(22) Filed: Dec. 14, 2007

(65) Prior Publication Data

US 2008/0197752 A1   Aug. 21, 2008

(30) Foreign Application Priority Data

Feb. 15, 2007   (JP) .............................. 2007-034377

(51) Int. Cl.
*H01L 41/08* (2006.01)
(52) U.S. Cl. ................. 310/367; 310/328; 310/366; 310/368
(58) Field of Classification Search ................. 310/367, 310/368, 370
See application file for complete search history.

(56) References Cited

U.S. PATENT DOCUMENTS

| | | | | |
|---|---|---|---|---|
| 4,035,674 A | * | 7/1977 | Oguchi et al. ............... | 310/320 |
| 4,355,257 A | * | 10/1982 | Kawashima et al. ......... | 310/361 |
| 4,469,979 A | * | 9/1984 | Chuang ....................... | 310/370 |
| 4,724,351 A | * | 2/1988 | EerNisse et al. ............. | 310/328 |
| 5,144,184 A | * | 9/1992 | Greiff .......................... | 310/312 |
| 5,285,127 A | * | 2/1994 | Egley et al. .................. | 310/366 |
| 5,541,469 A | * | 7/1996 | Kaida .......................... | 310/367 |

FOREIGN PATENT DOCUMENTS

| JP | A-02-248866 | 10/1990 |
|---|---|---|
| JP | A-4-337430 | 11/1992 |
| JP | A 2007-163244 | 6/2007 |

\* cited by examiner

*Primary Examiner*—Mark Budd
(74) *Attorney, Agent, or Firm*—Oliff & Berridge, PLC

(57) ABSTRACT

A stress sensitive element includes a vibrating arm having an electrode, a beam portion integrated with the vibrating arm at both ends of the vibration arm, and a connecting portion interposed between the beam portion and the vibrating arm. The element is placed by providing a fixing portion to one of the connecting portion and the beam portion, and an extending direction of the vibrating arm is orthogonal to a stress direction to be detected.

4 Claims, 3 Drawing Sheets

STRESS SENSITIVE ELEMENT

BACKGROUND OF THE INVENTION

1. Technical Field

The present invention relates to a stress sensitive element, in particular, to one suitably used for detection of stress such as acceleration by utilizing change in resonance frequency of a piezoelectric resonator.

2. Related Art

Acceleration sensors have been widely used not only in automobiles, airplanes and rockets but also in various industrial plants for the use of, for example, monitoring abnormal vibration. JP-A-2-248866 discloses a beam structure of an acceleration sensor shown in a perspective view of FIG. 6. In FIG. 6, the reference symbol 50 denotes a double-ended tuning fork type quartz resonator having two vibrating beams 51, the reference symbol 52 denotes a bonding portion of the double-ended tuning fork type quartz resonator 50, and the reference symbol 60 denotes a beam constituted by quartz having the same cutting angle as that of the double-ended tuning fork type quartz resonator 50. The beam 60 has projecting portions 70 having a thicker thickness than that of other parts thereof. The projecting portions 70 and the bonding portion 52 of the double-ended tuning fork type quartz resonator 50 are bonded by using adhesive or the like. Then, a weight 80 is provided on a free end of the beam 60 and the other end opposite to the weight 80 is fixed to a base 90.

The base 90 of the acceleration sensor constructed as shown in FIG. 6 is fixed on an object to be measured. When the acceleration is applied in the direction of the arrow, the weight 80 makes the beam 60 bend, and compression stress or extension stress is then applied to the double-ended tuning fork type quartz resonator 50 fixed to the beam 60, resulting in change of the frequency. In sum, the acceleration sensor is one that determines the magnitude of acceleration from the amount of the frequency change. According to the disclosure of JP-A-2-248866, the projecting portions 70 are formed on the beam 60, so the magnitude of stress applied to the double-ended tuning fork type quartz resonator 50 is increased as compared with the case in which no projecting portions, thereby making it possible to provide an acceleration sensor of high sensitivity while preventing the plate thickness of the beam 60 from becoming thinner and avoiding increase in the mass of the weight 80.

However, the acceleration sensor disclosed in JP-A-2-248866 is constructed in a way that the beam 60 constructed by quartz having the same cutting angle as that of the double-ended tuning fork type quartz resonator 50 is bonded to the resonator and the weight is bonded to the free end of the beam 60. As a result, there arises a problem in that the number of man-hours increases and the manufacturing cost becomes high.

SUMMARY

An advantage of the present invention is to provide a stress sensitive element capable of steadily detecting stress with low cost.

A stress sensitive element according to one aspect of the invention includes: a vibrating arm having an electrode; a beam portion integrated with the vibrating arm at both ends of the vibration arm; and a connecting portion interposed between the beam portion and the vibrating arm. The element is placed by providing a fixing portion to the connecting portion or the beam portion, and an extending direction of the vibrating arm is orthogonal to a stress direction to be detected.

As thus constructed, the fabrication can be easily performed by, for example, etching process, so the manufacturing cost can be reduced.

In this case, the fixing portion may be provided to the connecting portion, and a constriction provided to the beam portion. As thus constructed, it is possible to allow the beam portion to easily bend due to the constriction, so the stress in a single direction can be sensitively detected.

In this case, the central portion of the beam portion may be used as a fixing portion. As thus constructed, the stress in a single direction can be sensitively detected.

In this case, the element may include a plurality of constrictions provided to the beam portion in one or more symmetrical pairs on either side of the fixing portion in the extending direction of the vibrating arm. As thus constructed, it is possible to allow the beam portion to easily bend due to the constriction, so the stress in a single direction can be sensitively detected.

It is preferable that the vibrating arm be a double-ended tuning fork type.

As thus constructed, the properties of stress-frequency change can be enhanced, so the stress detection sensitivity can be enhanced and the degree of stability can be increased.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings.

Figure 1A:
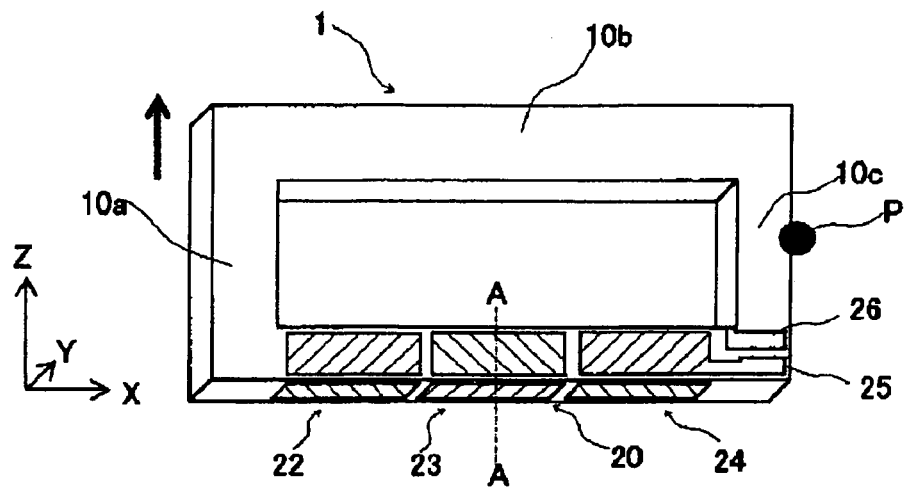
FIG. 1A is a schematic perspective view illustrating the structure of a stress sensitive element according to an embodiment of the invention.

FIG. 1A is a perspective view illustrating the structure of a stress sensitive element 1 according to an embodiment of the invention.

The stress sensitive element 1 shown in FIG. 1A is made of quartz, which is a piezoelectric material. The stress sensitive element 1 has a vibrating arm 20 and beam portions 10b each integrally formed in the both ends of the vibrating arm 20. That is, an end of the connecting portion 10 and an end of the beam portion 10b are bonded to each other, the other end of the beam portion 10b and an end of the connecting portion 10c are bonded to each other, and the both ends of the vibrating arm 20 are bonded to the other end of the connecting portion 10a and the other end of the connecting portion 10c.

The stress sensitive element 1 thus constructed can be integrally formed by performing etching process to a quartz plate by utilizing known photolithography technique and etching means.

The vibrating arm 20 has first, second, third electrode portions 22, 23, 24 adjacent to each other, a lead electrode (not shown), and terminal electrodes 25, 26 provided on the respective ends of the vibrating arm 20. The first, second and third electrode portions 22, 23, 24 each have an electrode on four planes except the both ends of the vibrating arm 20 and connect the respective opposite electrodes of the respective electrode portions by the lead electrode. Further, an upper surface electrode of the first electrode portion 22 (XZ plane), a lateral surface electrode of the second electrode portion 23 (XY plane) and an upper surface electrode of the third electrode portion 24 (XZ plane) are connected to a terminal electrode 25 formed on the end of the vibrating arm 20 by using the lead electrode. Furthermore, a lateral surface electrode of the third electrode portion 24 (XY plane), an upper surface electrode of the second electrode portion 23 (XZ plane) and a lateral surface electrode of the third electrode portion 24 (XY plane) are connected to a terminal electrode 26 formed on the end of the vibrating arm 20 by using the lead electrode.

Figure 1B:
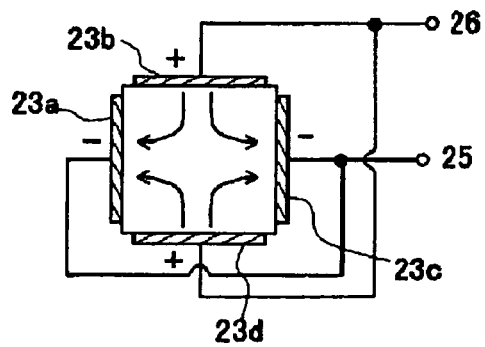
FIG. 1B is a sectional view showing electrodes and the connection thereof.

FIG. 1B is a sectional view showing the electric charge generated at a moment on electrodes 23a, 23b, 23c and 23d of the second electrode portion 23 and the connection of the electrodes 23a, 23b, 23c and 23d.

The first, second, third electrode portions 22, 23, 24 are formed on the vibrating arm 20. When a high frequency voltage is applied to the terminal electrodes 25 and 26, the vibrating arm 20 performs a flexural vibration with a natural frequency within the X-Z plane while its both ends serve a node. The natural frequency (resonance frequency) of the vibrating arm 20 changes depending on stress (compression or extension) applied to the vibrating arm 20.

As shown in FIG. 1A, a central portion of the connecting portion 10c adjacent to the vibrating arm 20 is fixed (as a fixing portion P) and the Z-axis direction, orthogonal to an extending direction of the vibrating arm 20, is defined as a direction of an acceleration detection axis. For example, the acceleration occurs in the +Z-axis direction (direction of arrow), the stress due to inertia force in the minus Z-axis direction is applied to the stress sensitive element 1, and the beam portion 10b is bent (warped) in this direction since the point P is fixed. At this time, such an effect is caused as to narrow the distance between the connecting portion 10a and the connecting portion 10c, so the compression stress is applied to the vibrating arm 20 and the resonance frequency changes so as to become lower. On the other hand, when the acceleration occurs in the minus Z-axis direction (opposite direction to the direction of arrow), the stress due to inertia force in the +Z-axis direction is applied to the stress sensitive element 1, and the beam portion 10b of the stress sensitive element 1 is bent (warped) in this direction. At this time, such an effect is caused as to broaden the distance between the connecting portion 10a and the connecting portion 10c, so the extension stress is applied to the vibrating arm 20 and its resonance frequency changes so as to be higher. It is possible to determine the applied stress by detecting this frequency change.

In the case of the stress sensitive element 1 according to this embodiment of the invention, a flat quartz plate is widely etched in its central portion by utilizing a photolithography technique and etching means so that only the peripheral portion thereof remains, thereby making a quartz structure having a rectangular shape. At one end of this quartz structure, there are formed, by using deposition means or the like, the first, second and third electrode portions 22, 23, 24, and the lead electrode (not shown) and the terminal electrodes 25, 26, as shown in FIG. 1A.

As thus constructed, the thermal expansion coefficient of the structure becomes uniform, thereby making it possible to advantageously minimize the influence of the temperature change. Furthermore, the quartz plate is processed by utilizing a photolithography technique and etching means, thereby also making it possible to advantageously form the functional part freely, enhance the accuracy of finishing and achieve miniaturization while only a few man-hours are needed.

Figure 2:
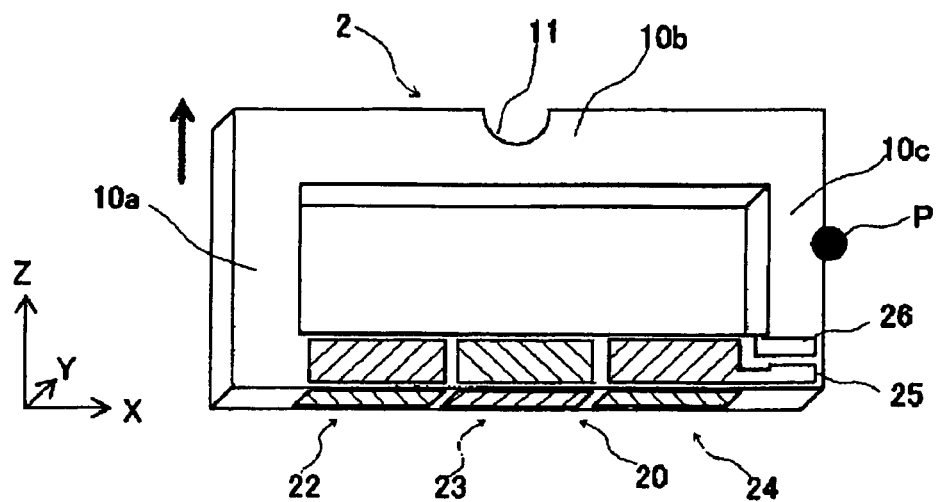
FIG. 2 is a perspective view illustrating the structure of a stress sensitive element according to a second embodiment of the invention.

FIG. 2 is a perspective view illustrating the structure of a stress sensitive element 2 according to a second embodiment of the invention.

The stress sensitive element 2 is different from the stress sensitive element 1 shown in FIG. 1A in that a rounded constriction 11 is formed in the central portion of the beam portion 10b on the opposite end to the vibrating arm 20.

As shown in FIG. 2, since the constriction 11 is formed in the beam portion 10b, so the bending portion 10b can easily bend upon the stress applied to the axis direction for acceleration detection (Z-axis direction), so the stress detection sensitivity is advantageously enhanced.

Figure 3:
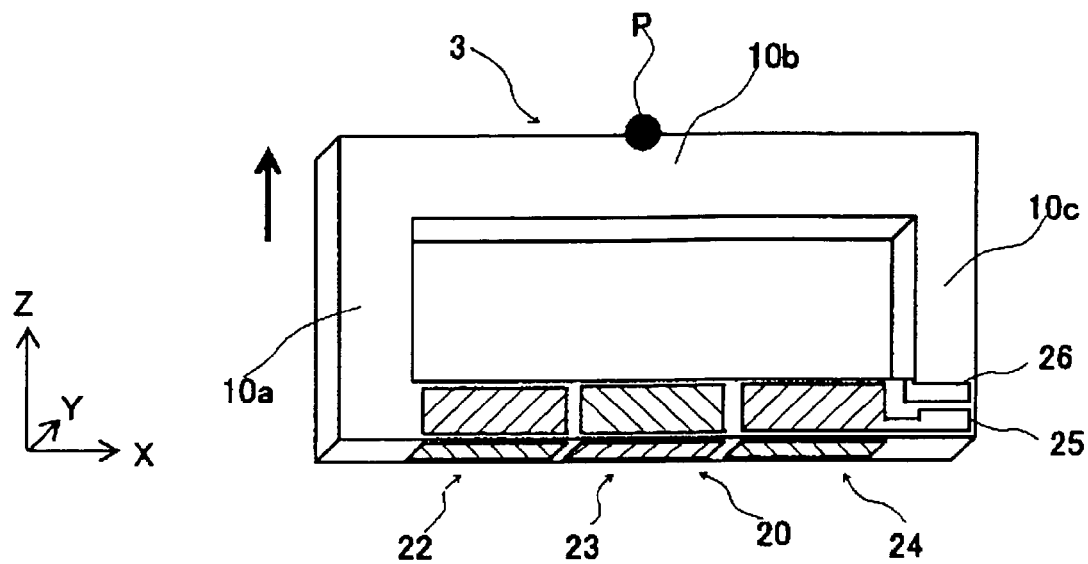
FIG. 3 is a perspective view illustrating the structure of a stress sensitive element according to a third embodiment of the invention.

FIG. 3 is a perspective view illustrating the structure of a stress sensitive element 3 according to a third embodiment of the invention, which is different from the stress sensitive element 1 shown in FIG. 1A in that the portion, at which the stress sensitive element 3 is fixed, is made substantially the center portion of the beam portion 10b on the opposite side to the vibrating arm 20. As shown in FIG. 3, since the substantially central portion of the beam portion 10b is fixed, so when the acceleration occurs in the axis direction for acceleration direction (Z-axis direction), the beam portion 10b bends while the fixing portion P located at the central portion becomes on the top or on the bottom thereof.

Figure 4:
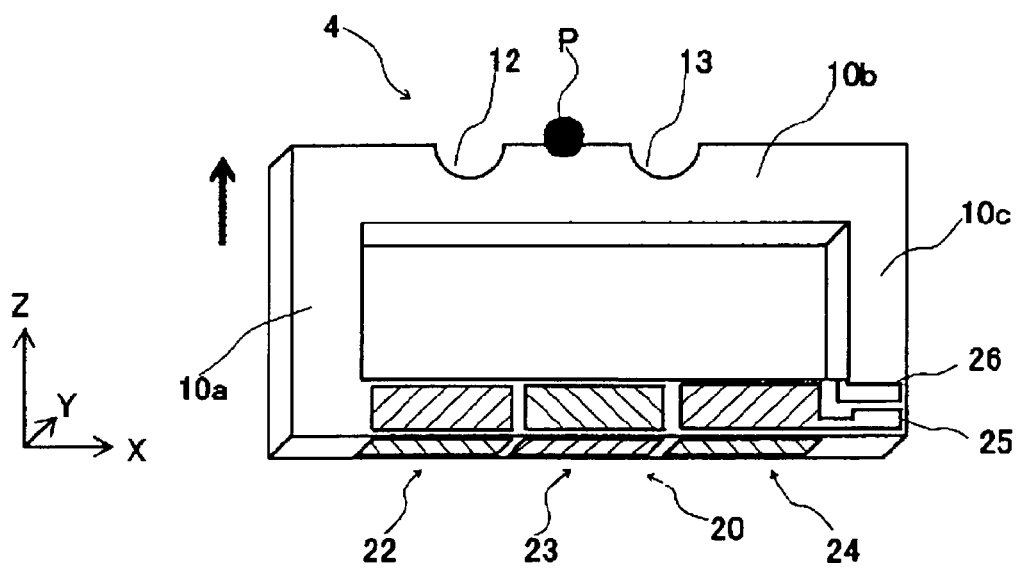
FIG. 4 is a perspective view illustrating the structure of a stress sensitive element according to a fourth embodiment of the invention.

FIG. 4 is a perspective view illustrating the structure of a stress sensitive element 4 according to a fourth embodiment, which is different from the stress sensitive element 1 shown in FIG. 1A in that the substantially central portion of the beam portion 10b on the opposite side to the vibrating arm 20 is made as a fixing portion P and, in addition to this, constrictions 12, 13 are provided across the point P. By thus constructing as shown in FIG. 4, the beam portion 10b easily bends upon the stress applied in the axis direction for acceleration detection (Z-axis direction), so the stress detection sensitivity is advantageously enhanced.

Figure 5:
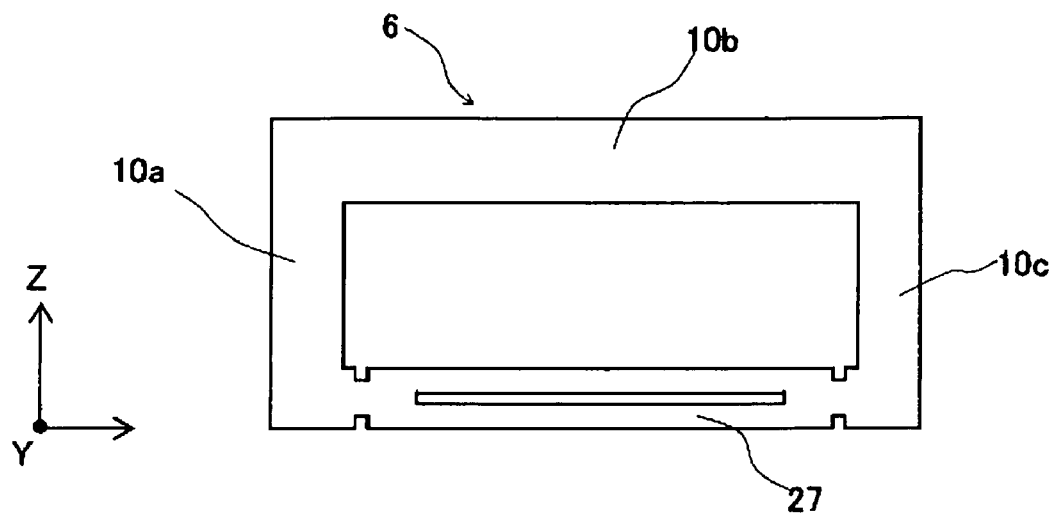
FIG. 5 is a plan view illustrating the structure of a stress sensitive element according to a fifth embodiment of the invention.
Figure 6:
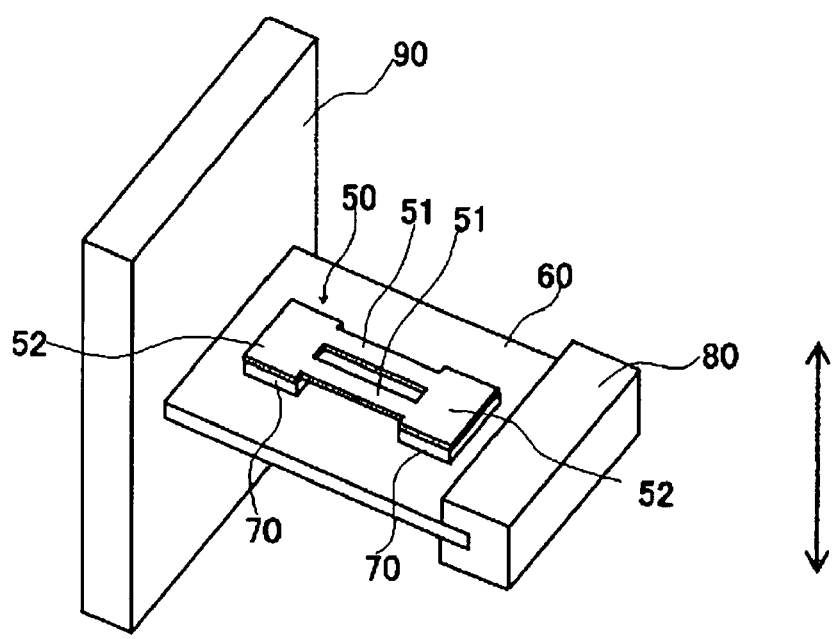
FIG. 6 is a perspective view showing a related art acceleration sensor.

FIG. 5 is a plan view illustrating the structure of a stress sensitive element 6 according to a fifth embodiment of the invention, which is different from the stress sensitive element 1 shown in FIG. 1 in that a double-ended tuning fork type quartz resonator element 27 is used as the vibrating arm. The relationship between the change of the resonance frequency of the double-ended tuning fork type quartz resonator element 27 and the stress (compression or extension) applied is represented by a substantially straight line, as is commonly known.

Therefore, provided that the resonance frequency of the double-ended tuning fork type quartz resonator element 27 is made to be f0 in the case in which no stress is applied to the double-ended tuning fork type quartz resonator element 27, as the extension stress is applied to the double-ended tuning fork type quartz resonator element 27, the resonance frequency becomes higher than f0, and as the compression stress is applied, the resonance frequency becomes lower than f0. As a result, the relationship between the applied stress and the resonance frequency is represented by the substantially straight line.

The fixing portion P for the stress sensitive element 6 shown in FIG. 5 may be in the substantially central portion of the connecting portion 10*c* or in the central portion of the beam portion 10*b*. Further, a constriction may be provided in the substantially central portion of the beam portion 10*b*, as shown in FIG. 2 and FIG. 4, or on the either side thereof sandwiching the central portion.

It should be noted that the above mentioned embodiments of the invention have been explained while taking the cases as examples in which flat quartz is processed by using a photolithography technique and etching means so that a rectangular shaped quartz structure is formed. However, it should not be construed as restrictively. It is also possible to form a functional member having a reversed C shape by bonding the ends of the connecting portions 10*a*, 10*c* and the beam portion 10*b* made of an elastic material having elasticity and to form a rectangular-shaped stress sensitive element by bonding the both ends of the vibrating arm 20 to the functional member. Moreover, it is also possible to perform etching process to a flat elastic member so as to form a functional member having a reversed C shape and to constitute a rectangular-shaped stress sensitive element by bonding the both sides of the vibrating arm 20 to the openings thereof. As thus constructed, the accuracy of finishing is enhanced and the cost can be reduced as compared to the case in which the ends of the connecting portions 10*a*, 10*c* and the beam portion 10*b* are bonded to each other, thereby forming a functional member having a reversed C shape. Furthermore, in the case in which the functional member is formed by performing etching process, the shape of the functional member can be more freely selected. For example, the U-shaped functional member can be formed by etching and the vibrating arm is bonded to the opening thereof, thereby constituting a stress sensitive element.

Yet further, the stress sensitive element 1 shown in FIG. 1A is constructed in a way that the central portion P of the connecting portion 10*c* is fixed. As a result, there may be a case in which inertia force is generated on the connecting portion 10*a* upon the acceleration in the X-axis direction (the extending direction of the vibrating arm 20), so the effect of compression or extension of the vibrating arm 20 can be likely to occur.

With respect to this, as in the case with the stress sensitive element 3 shown in FIG. 3, for example, in which the portion, at which the stress sensitive element 3 is fixed, is in the substantially central portion of the beam portion 10*b* on the opposite side to the vibrating arm 20, the connecting portions 10*a* and 10*c* can bend in the same direction upon the acceleration in the X-axis direction. Therefore, the distance between the connecting portions 10*a* and 10*c* can be easily kept the same both prior to and subsequent to the acceleration, so there is an advantage that the effect causing the compression or extension of the vibrating arm 20 hardly occurs.

What is claimed is:

1. A stress sensitive element comprising:
   a vibrating arm having an electrode;
   a beam portion integrated with the vibrating arm at both ends of the vibrating arm; and
   a connecting portion interposed between the beam portion and the vibrating arm, wherein the element is placed by providing a fixing portion to one of the connecting portion and the beam portion, and an extending direction of the vibrating arm is orthogonal to a stress direction to be detected, and the fixing portion is provided to the connecting portion, and a constriction is provided to the beam portion.

2. A stress sensitive element comprising:
   a vibrating arm having an electrode;
   a beam portion integrated with the vibrating arm at both ends of the vibrating arm; and
   a connecting portion interposed between the beam portion and the vibrating arm, wherein the element is placed by providing a fixing portion to one of the connecting portion and the beam portion, and an extending direction of the vibrating arm is orthogonal to a stress direction to be detected, and the fixing portion is provided at a substantially central portion of the beam portion, and a plurality of constrictions is provided to the beam portion in one or more symmetrical pairs on either side of the fixing portion in the extending direction of the vibrating arm.

3. The stress sensitive element according to claim 1, wherein the vibrating arm is a double-ended tuning fork type.

4. The stress sensitive element according to claim 2, wherein the vibrating arm is a double-ended tuning fork type.

* * * * *